United States Patent [19]
Srinivasan et al.

[11] Patent Number: 5,998,524
[45] Date of Patent: *Dec. 7, 1999

[54] THERMOPLASTIC POLYPROPYLENE BLENDS WITH MIXTURES OF ETHYLENE/BUTENE AND ETHYLENE/OCTENE COPOLYMER ELASTOMERS

[75] Inventors: Satchit Srinivasan, Carrollton; Edward Szczepaniak, Arlington; Sunit S. Shah, Irving, all of Tex.; David K. Edge, New Boston, Mich.

[73] Assignee: Solvay Engineered Polymers, Grand Prairie, Tex.

[ * ] Notice: This patent is subject to a terminal disclaimer.

[21] Appl. No.: 08/960,474

[22] Filed: Oct. 29, 1997

Related U.S. Application Data

[60] Division of application No. 08/480,175, Jun. 7, 1995, Pat. No. 5,763,534, which is a continuation-in-part of application No. 08/296,293, Aug. 25, 1994, Pat. No. 5,773,515.

[51] Int. Cl.$^6$ .......................... C08L 23/12; C08L 23/14; C08L 23/16; C08K 3/18
[52] U.S. Cl. .................. 524/425; 524/449; 524/451; 524/528; 525/88; 525/240
[58] Field of Search .................. 525/240, 88; 524/451, 524/425, 449, 528

[56] References Cited

U.S. PATENT DOCUMENTS

| | | | |
|---|---|---|---|
| 4,734,459 | 3/1988 | Cecchin et al. | 525/240 |
| 4,774,292 | 9/1988 | Thiersault et al. | 525/240 |
| 4,812,526 | 3/1989 | Rifi | 525/240 |
| 5,026,778 | 6/1991 | Fujii et al. | 525/240 |
| 5,286,552 | 2/1994 | Lesca et al. | 525/240 |
| 5,308,908 | 5/1994 | Fukui et al. | 525/240 |
| 5,391,618 | 2/1995 | Yamamoto et al. | 525/88 |
| 5,414,027 | 5/1995 | DeNicola, Jr. et al. | 522/112 |
| 5,416,151 | 5/1995 | Tanaka | 524/484 |
| 5,576,374 | 11/1996 | Betso et al. | 524/451 |
| 5,639,816 | 6/1997 | Yamaguchi et al. | 525/240 |
| 5,639,829 | 6/1997 | Yamaguchi et al. | 525/240 |
| 5,744,086 | 4/1998 | Hallam | 525/240 |
| 5,763,534 | 6/1998 | Srinivasan et al. | 525/240 |
| 5,773,515 | 6/1998 | Srinivasan et al. | 525/240 |
| 5,804,660 | 9/1998 | Whetten et al. | 525/240 |
| 5,811,494 | 9/1998 | Whetten et al. | 525/240 |

FOREIGN PATENT DOCUMENTS

| | | |
|---|---|---|
| 0496625 | 7/1992 | European Pat. Off. . |
| 0519725 | 12/1992 | European Pat. Off. . |
| 94/06859 | 3/1994 | WIPO . |

OTHER PUBLICATIONS

Dow Plastics brochure on Engage Polyoflefin Elastomers (1996).
"Dow Launches New Elastomer Family Globally", News Release from Dow Plastics (Feb. 1994).
"Engage Polyolefin Elastomers Fact Sheet", News Release from Dow Plastics (Feb. 1994).
G.D. Schwank, Selected Applications for Constrained Geometry Catalyst Technology (CGCT) Polymers, presented at SPO 1992 (Sep. 1992).
S.P. Chum et al., New Polyolefin Based Elastomers For TPO Impact Modification, presented at SPO 1993 (Sep. 1993).
B.A. Story et al., "The New Family of Polyolefins From Insite Technology", presented at MetCon 1993(1993).
S.P. Chum et al., New Polyolefin Based Elastomers for TPO Impact Modifications (1994) pp. 1–3.

*Primary Examiner*—Donald R. Wilson
*Attorney, Agent, or Firm*—Pennie & Edmonds LLP

[57] ABSTRACT

Thermoplastic olefinic, polymer blends which have superior physical properties and adherence for coating materials such as paints are disclosed. The blends may be formed from various combinations of thermoplastic components such as a crystalline isotactic propylene polymer, and sequentially polymerized blends of polypropylene and ethylene-propylene copolymers, with elastomeric components such as copolymers of ethylene and butene, and copolymers of ethylene and octene which are produced with metallocene or Kaminsky catalysts. If desired, other components, such as fillers, can be included.

15 Claims, 5 Drawing Sheets x 10000 1μ

THERMOPLASTIC POLYPROPYLENE BLENDS WITH MIXTURES OF ETHYLENE/BUTENE AND ETHYLENE/OCTENE COPOLYMER ELASTOMERS

CROSS REFERENCE TO RELATED APPLICATIONS

This application is a division of application Ser. No. 08/480,175 filed Jun. 7, 1995, now U.S. Pat. No. 5,763,534, which is a continuation-in-part of application Ser. No. 08/296,293 filed Aug. 25, 1994, now U.S. Pat. No. 5,773,515.

FIELD OF THE INVENTION

The invention relates to thermoplastic olefinic polymer compositions and products thereof which have superior physical properties including improved wear resistance, as well as enhanced adherence for coating materials such as paints.

BACKGROUND OF THE INVENTION

Polymer blends can be formed or shaped into lightweight and durable articles such as automobile parts, toys, and housings for various types of equipment. Polymer blends such as those with polypropylene and ethylene-propylene copolymers, however, are difficult to form into products which are simultaneously lightweight, easily processed into large parts and have surfaces which are durable and adherent to paints.

Many attempts have been made to enhance the properties of products formed of polymer blends such as those formed of propylenenethylene copolymers. Japanese patent publication Nos. 57-57049, 62-5460 and 62-5461 each attempt to do so by improving the fluidity and stiffness of blends of polypropylene with ethylene-propylene copolymer. In addition, Japanese patent publication No. 61-19651 also employs blends which have a large amount of propylene.

The propylene-ethylene copolymer blends shown in the above publications suffer from relatively slow crystallization rates. As a result, longer cooling periods are required to manufacture injection molded products. These blends, moreover, do not necessarily provide products which have excellent durability, such as surface smoothness and surface hardness.

Japanese patent publication No. 60-3420 shows a polymer blend which includes polypropylene, ethylene-propylene copolymer, talc and propylene-ethylene block copolymer. This composition is said to show adhesion for coatings as well as low temperature impact resistance.

Japanese patent Laid-Open publication No. 1-204946 shows a composition comprising ethylene-propylene copolymer, polyethylene, ethylene copolymer, polypropylene and talc. This composition is said to provide products which have dimensional stability.

European patent applications EP 0 519 752 A2 and EP 0496 625 A2 each show blends which comprise ethylene copolymer, propylene polymer and propylene-ethylene "block" copolymer and talc. These blends are said to have good processability for injection molding. Ease of processability is often associated with low melt viscosities (high melt flow rates). These high melt flow rates are often detrimental to other physical properties such as impact strength at low temperatures. Injection molded products formed of these blends are said to have good appearance, low density, good surface hardness and impact resistance, as well as good adhesion.

The above mentioned blends are said to have a morphological structure comprised crystalline domains embedded in amorphous matrix, contrary to conventional thermoplastic polyolefin blends in which elastomer domains are dispersed in a polypropylene matrix. This structure, however, still has regions where the concentration of elastomers is significantly higher than in surrounding areas, thus effectively exhibiting the existence of elastomeric "macrodomains". These macrodomains have-an average size of greater than 4 $\mu$m, which may negatively effect certain physical properties of the blend.

Although the compositions shown in the aforementioned references are said to possess good processability, products formed of these compositions tend to be deficient in one or more physical properties such as durability and paint-adhesion. A need therefore continues for thermoplastic blends which can be processed to provide products which have combined properties of superior surface hardness, impact resistance, processability, flexural modulus, adhesion of coating, and which can be painted using conventional techniques.

SUMMARY OF THE INVENTION

Thermoplastic compositions formed of olefinic, polymer blends and which have superior physical properties and adherence for coating materials such as paints are disclosed. These blends may be formed from various combinations of thermoplastic and elastomeric components. The thermoplastic component can include a homopolymer of propylene having an isotactic index which is greater than about 0.93 or a crystallinity which is greater than about 56%; a sequentially polymerized blend of a semi-crystalline polypropylene and an ethylene-propylene copolymer; or mixtures thereof. The elastomeric component can include a copolymer of ethylene and a $C_3$ to $C_8$ olefin produced with a metallocene or Kaminsky catalyst and having a molecular weight distribution (Mw/Mn) of less than or equal to 3. These catalysts are also called "single site" catalysts.

In this specification, the following definitions will be used to define certain components of these compositions:

Thermoplastic components:

Component (1A): homopolymers and random copolymers of propylene having an isotactic index of greater than about 0.93, preferably greater than about 0.96 or a crystallinity of greater than about 56%, preferably greater than about 65%. These components also a density of greater than about 0.898 g/cc, preferably greater than about 0.906 g/cc;

Component (1B): a sequentially polymerized blend or "block" copolymer of polypropylene and a copolymer of ethylene with propylene or ethylene with another alpha-olefin; and Component (1C): a mixture of (1A) and (1B).

Elastomeric Components:

As noted above, any copolymer of ethylene and a $C_3$ to $C_8$ olefin produced with a metallocene or Kaminsky catalyst and having a molecular weight distribution (Mw/Mn) of less than or equal to 3 is contemplated for use as this component. Specially preferred components are as follows:

Component (2): copolymers of ethylene and butene ("EB") produced with metallocene, Kaminsky or "single site" catalysts and which have Mw/Mn of less than or equal to 3;

Component (3): copolymers of ethylene and octene produced with metallocene, Kaminsky or "single site" catalysts and having Mw/Mn of less than or equal to 3; and A mixture of components (2) and (3).

In addition, the present compositions may also include component (4), which is a copolymer of ethylene and a $C_3$ to $C_{15}$ olefin having a crystallinity of at least about 30%. Copolymers of ethylene with $C_4$–$C_{10}$ alpha-olefins such as butylene, pentylene, hexylene, septylene, octylene, nonylene, and decylene, are preferred. These olefins and polymers thereof can be branched or linear.

Useful blends of Group (I) include blends of any one or more of thermoplastic components (1A)–(1C) with elastomeric components (2), (3) or mixtures of (2) and (3), such as:

Blend (Ia) formed of combinations of component (1A) with component (2);

Blend (Ib) formed of combinations of component (1A) with component (3);

Blend (Ic) formed of combinations of component (1B) with component (2);

Blend (Id) formed of combinations of component (1B) with component (3);

Blend (Ie) formed of combinations of component (1C) with component (2);

Blend (If) formed of combinations of component (1C) with component (3).

Useful blends of Group (II) include blends of any one of components (1A)–(1C) with component (2) and/or component (3) and/or component (4). Illustrative blends of Group (II) include:

Blend (IIA) formed of combinations of component (1A) with component (2) and component (3) and EP;

Blend (IIB) formed of combinations of component (1A) with component (2) and component (3) and EB;

Blend (IIC) formed of combinations of component (1A) with component (2) and component (3) and component (4);

Blend (IID) formed of combinations of component (1B) with component (2) and component (3) and EP;

Blend (IIE) formed of combinations of component (1B) with component (2) and component (3) and EB;

Blend (IIF) formed of combinations of component (1B) with component (2) and component (3) and component (4);

Blend (IIG) formed of combinations of component (1C) with component (2) and component (3) and EP;

Blend (IIH) formed of combinations of component (1C) with component (2) and component (3) and EB;

Blend (IIK) formed of combinations of component (1C) with component (2) and component (3) and component (4)

Useful blends of Group (III) can be formed of combinations of any of the blends of Groups (I) or (II) with fillers such as talc or calcium carbonate, mica, glass fibers, or other inorganic materials that are conventionally utilized in the art.

Useful compositions within the scope of the invention can be formed from any of the blends of Groups (I)–(III). These compositions have excellent paintability, a broad range of stiffness values, as well as high impact and tensile strengths which make them suitable for automotive applications. Blends of any of Groups (I), (II) and (III) also have excellent processability, as exhibited by high melt flow rates. Thus, the blends of Groups (I)–(III) are particularly suited for injection molding into thin wall articles. Such thin wall articles are used where impact resistance is important. Typical applications include automotive external parts such as bumpers and bumper covers, as well as interior and exterior automotive component trim.

The blends of the invention can be formed into articles which have a Rockwell R hardness of at least about 60 as measured according to ASTM D-785, a flexural modulus of at least about 80 kpsi as measured according to ASTM D-790, a melt flow rate of at least about 15 dg/min at 230° C. and 2.16 kg as measured according to ASTM D-1238, a minimum density of $\geq 0.89$ g/cc, and are ductile at about $-30°$ C. at a velocity of about 5 mph as measured according to ASTM D-3763. These articles can be coated with paints such as two-component polyurethanes, acrylics, polyesters, epoxy resins, carboimides, urea resins, and melamine-formaldehyde resins.

Having briefly summarized the invention, the invention will now be described in detail by reference -to the following specification and non-limiting examples. Unless otherwise specified, all percentages are by weight and all temperatures are in degrees Celsius.

DETAILED DESCRIPTION OF THE INVENTION

Propylene polymers suitable for use in the invention typically have a Melt Flow Rate("MFR") at 230° C. and 2.16 kg, when measured in accordance with ASTM D-1238 of about 10 to 80 dg/min, preferably about 35 to 65 dg/min, most preferably about 45 to 55 dg/min. These MFRs may be attained by controlling polymerization of the propylene monomer, or by addition of an organic peroxide such as a diacyl peroxide or a dialkyl peroxide after polymerization of the propylene is completed. These techniques are well known in the art.

The propylene polymer employed may be a propylene homopolymer, or a copolymer of propylene and unsaturated monomers such as maleic anhydride, acrylic acid or trimethoxy vinyl silane. These monomers can be introduced to the propylene by graft copolymerization by methods known in the art.

Stereospecific catalysts can be employed in well known methods to produce propylene polymers suitable for use as a thermoplastic component according to this invention. Useful stereospecific catalysts can be prepared as disclosed in Japanese Patent Laid-Open Publication Nos. 56-100806, 56-120712 and 58-104907.

Propylene homopolymers useful as component (1A) have an isotactic index of greater than 0.93, preferably greater than 0.96, and/or a crystallinity greater than 56%, preferably greater than 65%, as determined from density measurements. These homopolymers are commercially available, and a good example is the series ELTEX P highly isotactic polypropylenes from Solvay.

Crystalline or semi-crystalline polypropylenes can be employed as component (1A) in the polymer blends of this invention. These may be blended with polyethylenes. Crystalline or semi-crystalline copolymers of propylene and ethylene also may be used, if desired. When a copolymer of propylene and ethylene is utilized, the copolymer either can be in the form of a random copolymer, a block copolymer, or a graft copolymer.

The terminology "crystalline or semi-crystalline" refers to components that are characterized by a sufficient degree of crystallinity, e.g. about 70–100%, such that their behavior is substantially that of a crystalline polyolefin ("crystalline") or by a degree of crystallinity, e.g. about 30–70%, sufficient to cause their behavior to exhibit substantial but not full crystalline polyolefin behavior ("semi-crystalline"). When polypropylene is used as the crystalline or semi-crystalline polyolefin, the polypropylene has 30–98% crystallinity, and typically between 56 and 70% crystallinity, as determined by X-ray analysis or solvent extraction. The terminology "substantially crystalline" is used to designate those polyolefins having crystallinity of between 30 and 98%.

Ethylene-Propylene ("EP") copolymers which have differing amounts of ethylene and propylene therein may be employed in component (1B) as well as in the blends of Group (II). EP copolymers for use in the invention can be prepared by copolymerizing ethylene and propylene in the presence of free radical coordination stereospecific polymerization catalysts, such as Phillips, Kaminsky or Ziegler-Natta catalysts. These preparation techniques are well known.

Generally, EP copolymers useful as component (1B) will be slightly crystalline or substantially amorphous, i.e., greater than 50% amorphous. Preferably; these copolymers will have a Mooney viscosity of about 10–90 at 100° C. The amount of propylene in the EP copolymer is not particularly limited provided that the Mooney viscosity is within the stated range. The EP copolymers may be completely replaced on a one-to-one basis by terpolymers of ethylene-propylene-diene monomers ("EPDMs") such as ethylidene norbornene, dicyclopentadiene, 1,4-hexadiene and the like. Useful copolymers may include mixtures of ethylene-propylene and EPDMs. The total content of ethylene in component (1B) may be between about 0% and about 30%, preferably about 20%. EP copolymers useful in Group (II) blends may have about 30–90% ethylene, preferably about 70% ethylene based on the total weight of the specific blend of Group (II).

The ethylene-butene ("EB") copolymers of component (2) which can be employed in the blends of Groups (I)–(III) are preferably produced by use of metallocene or Kaminsky catalysts. These copolymers typically have a narrow molecular weight distribution, i.e., (Mw/Mn) of less than 3, where Mw=weight average molecular weight and Mn=number average molecular weight. These EB copolymers can include ethylene in an amount of 5–95%, preferably about 50–90% and more preferably about 80%.

The ethylene-octene copolymers of component (3) which can be employed in the blends of Groups (I)–(III) also have a narrow molecular weight distribution (Mw/Mn) of less than 3 where Mw and Mn are defined as above. These ethylene-octene copolymers can be produced using methods such as those which employ metallocene or Kaminsky catalysts. These ethylene-octene copolymers can have 5–95% ethylene therein preferably about 50–90% and more preferably about 80%.

Useful blends of Group (I) can include blends of any of (Ia)–(If) as defined above. In blend (Ia), component (1A) can comprise about 50 to 80%, preferably 60 to 70%, remainder component (2); component (1A) can comprise about 50 to 80%, preferably 60 to 70%, of blend (Ib), remainder component (3); component (1B) can comprise about 50 to 80%, preferably 60 to 70%, of blend (Ic), remainder component (2); component (1B) can comprise 50 to 80% of blend (Id), remainder component (3); component (Ic) can comprise 50 to 80% of the blend (Ie), remainder component (2); component (1C) can comprise 50 to 80% of blend (If), remainder component (3).

The blends of Group (II) can be formed from combinations of any one of components (1A)–(1C) with components (2) and (3) with component (4). Regarding the latter, it is preferred to use any of EP, EB other than component (2), or copolymers of ethylene and $C_3$–$C_{15}$, preferably $C_4$–$C_{10}$ alpha olefins such as copolymers of ethylene with at least one of propylene, butylene, pentylene, hexylene, septylene, octylene, nonylene, and decylene. Illustrative Group (II) blends include but are not limited to:

about 50 to 80% component (1A) with about 10 to 35% component (2), about 10 to 25% component (3) and about 0 to 20% EP copolymer;

about 50 to 80% component (1A) with about 10 to 35% component (2), about 10 to 25% component (3) and about 0 to 20% EB copolymer other than component (2);

about 50 to 80% component (1A) with about 10 to 35% component (2), and about 10 to 25% component (3) with about 0 to 20% copolymer of ethylene with at least one of propylene, butylene, pentylene, hexylene, septylene, octylene, nonylene, and decylene;

about 50 to 80% component (1B) with about 10 to 35% component (2), about 10 to 25% component (3) and about 0 to 20% EP copolymer;

about 50 to 80% component (1B) with about 10 to 35% component (2), about 10 to 25% component (3) and about 0 to 20% ethylene-butene copolymer other than component (2);

about 50 to 80% component (1B) with about 10 to 35% component (2), about 10 to 25% component (3), and about 0 to 20% of a copolymer of ethylene with at least one of propylene, butylene, pentylene, hexylene, septylene, octylene, nonylene, and decylene;

about 50 to 80% component (1C) with about 10 to 35% component (2) and about 10 to 25% component (3) with about 0 to 20% EP copolymer;

about 50 to 80% component (1C) with about 10 to 35% component (2) and about 10 to 25% component (3) with about 0 to 20% ethylene-butene copolymer other than component (2); and about 50 to 80% component (1C) with about 10 to 35% component (2) and about 10 to 25% component (3) with about 0 to 20% copolymer of ethylene with at least one of butylene, pentylene, hexylene, septylene, octylene, nonylene, and decylene.

Each of the ethylene-butene copolymers and ethylene-octene copolymers of components (2) and (3) respectively, may be slightly crystalline, i.e., have up to about 20% crystallinity as calculated from density measurements. Preferably, each of the ethylene-butene and ethylene-octene copolymers are substantially amorphous. Amorphous ethylene-butene copolymers are available from Exxon Polymers Co. under the tradename EXXACT. Amorphous ethylene-octene copolymers are available from Dow Chemical Co. under the tradename ENGAGE.

Any of the blends of Groups (I) and (II) optionally may be combined with fillers such as talc, glass, mica, or calcium carbonate, and the like, preferably talc, to provide blends of Group III. These fillers may be present in an amount of about 0.1 to 10% and preferably about 3–5%.

Each of blends of Groups (I)–(III) provide products with superior combinations of mechanical and surface properties. Blends of Groups (I)–(III) can be molded into products which show a Rockwell R hardness of at least about 60 as measured according to ASTM D-785, a flexural modulus of at least about 80 kpsi as measured according to ASTM D-790, a melt flow rate of at least about 10 and preferably about 15 dg/min or more at 230 C. and 2.16 kg as measured according-to ASTM D-1238, a maximum density of 0.98 g/cc, and are ductile at −30° C. at a velocity of about 5 mph as measured according to ASTM D-3763.

Talc usable in the blends of Group III has a particle size less than 10 microns, preferably less than 5 microns, most preferably about 0.9 micron, and a specific surface area of about 3.5 m$^2$/g or more, preferably about 3.5–6.0 m$^2$/g. The amount of talc utilized depends on the other component(s) employed in the specific blend of Group (III). Typically, about 0.1 to 10 parts of talc by weight of the component(s), preferably about 0.1 to 8 parts, and more preferably between about 3 to 5 parts, may be employed.

The talc may be prepared by dry pulverization and subsequent dry classification. The average particle size of the talc employed is a particle size at a cumulative amount of 50% by weight in a cumulative particle size distribution curve obtained by a liquid phase sedimentation light transmission method using, for instance, Model CP manufactured by Shimadzu Corp. The specific surface area measuring apparatus Model SS-100 is produced by Shimadzu Corp.

Talc filler employed in the invention need not be treated. However, to improve adhesion between the talc filler and the polymers employed in the blends of Group III, as well as for dispersibility of the talc in those component blends, the talc may be treated with organic titanate coupling agents, silane coupling agents, fatty acids, metal salts of fatty acids, fatty acid esters, and the like.

Various additives may be combined with any of the blends of Groups (I)–(III) unless they substantially impair the advantageous properties of those component blends. Useful additives include for example, process stabilizers, antioxidants, ultraviolet absorbers, soap such as metal soaps, anti-static agents, lubricants, nucleating agents, pigments and dispersant for pigment. In addition, additives capable of imparting higher flexural modulus to the blend than that imparted by talc can be included. Examples of these additives include fibrous potassium titanate, fibrous magnesium oxalate, fibrous aluminum borate, and carbon fibers.

Figure 1:
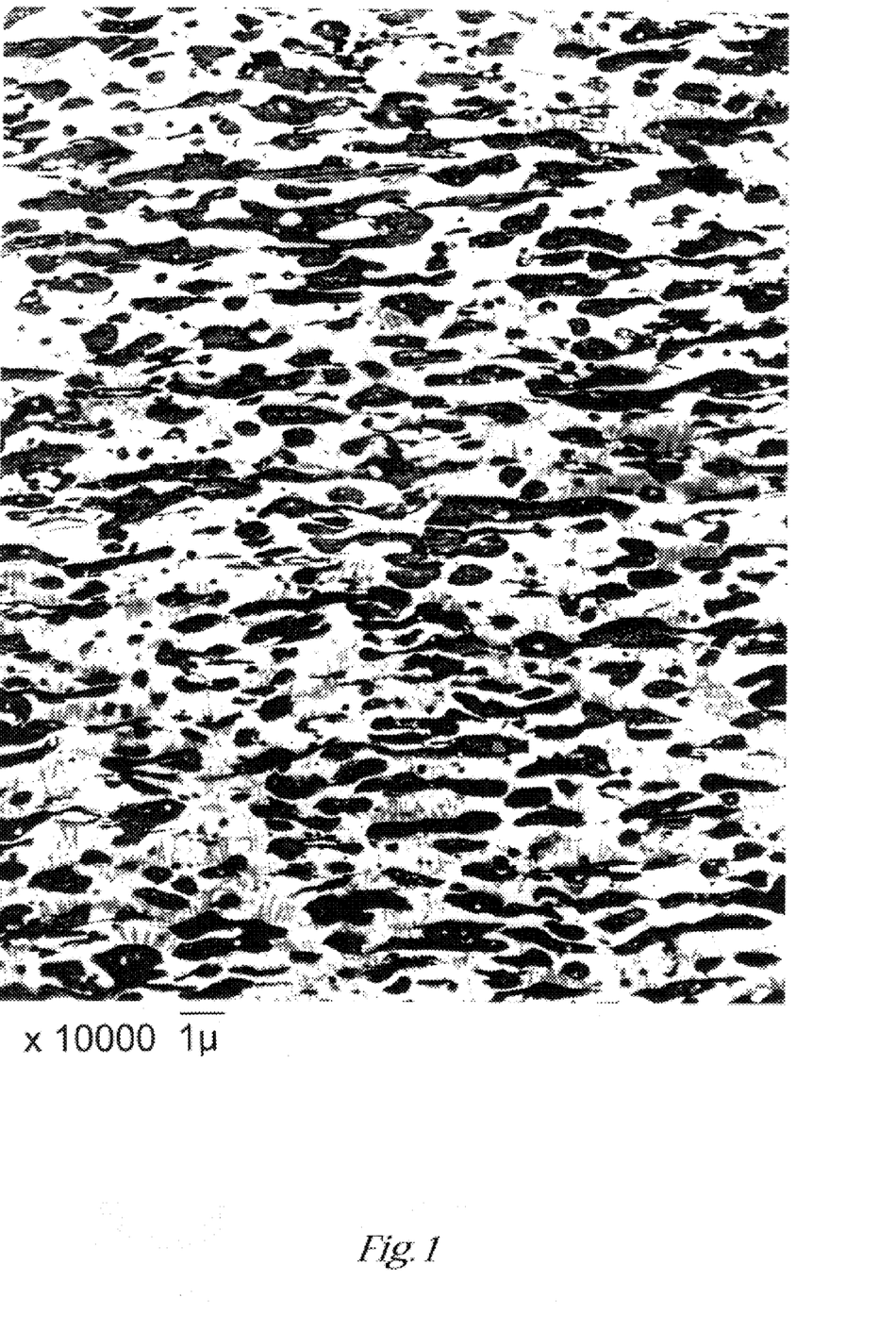
FIG. 1 is a transmission electron micrograph of the core portion of composition of example No. 5 of the invention.
Figure 2:
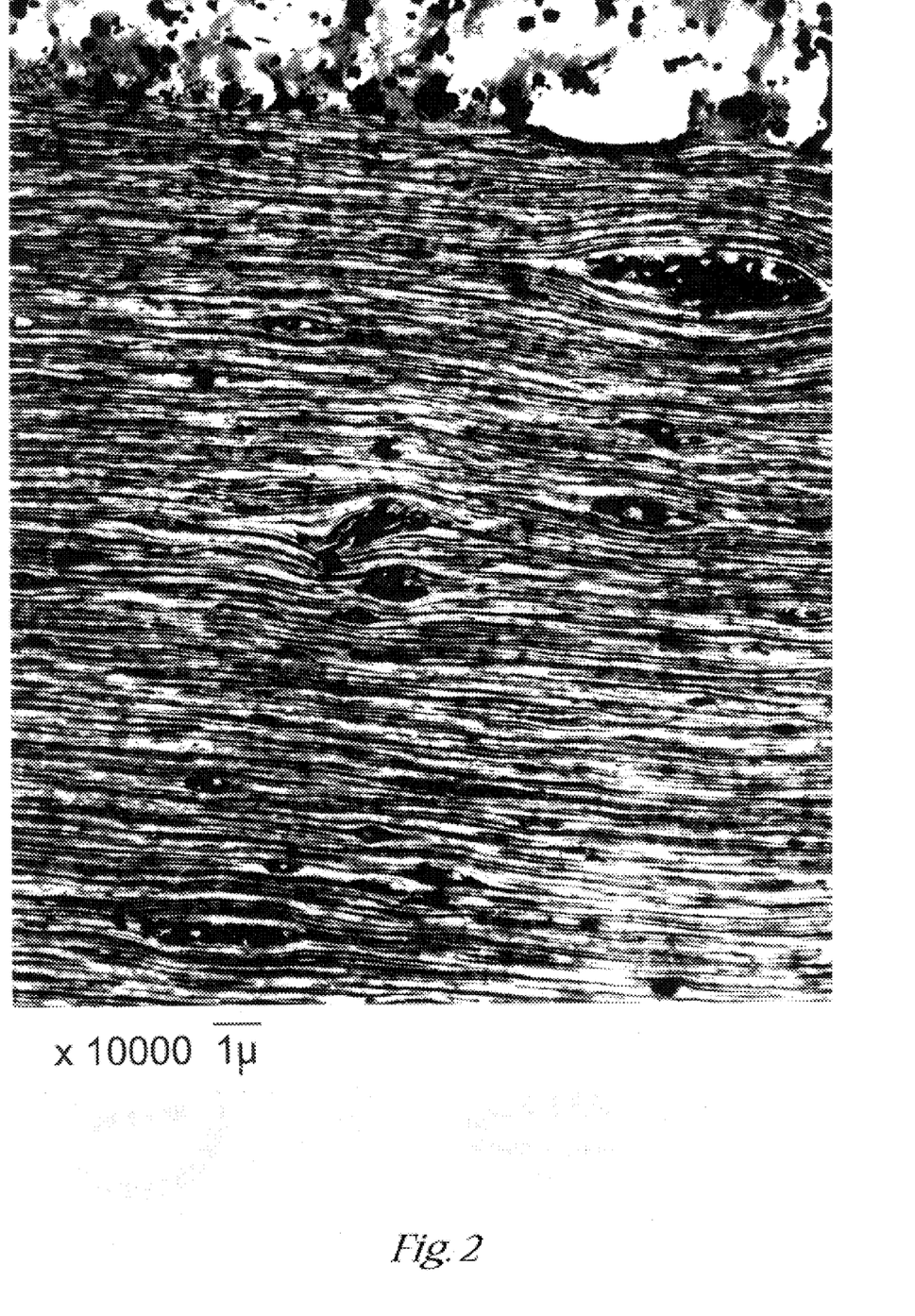
FIG. 2 is a transmission electron micrographs of the skin layer of the composition of example. No. 5 of the invention.
Figure 3:
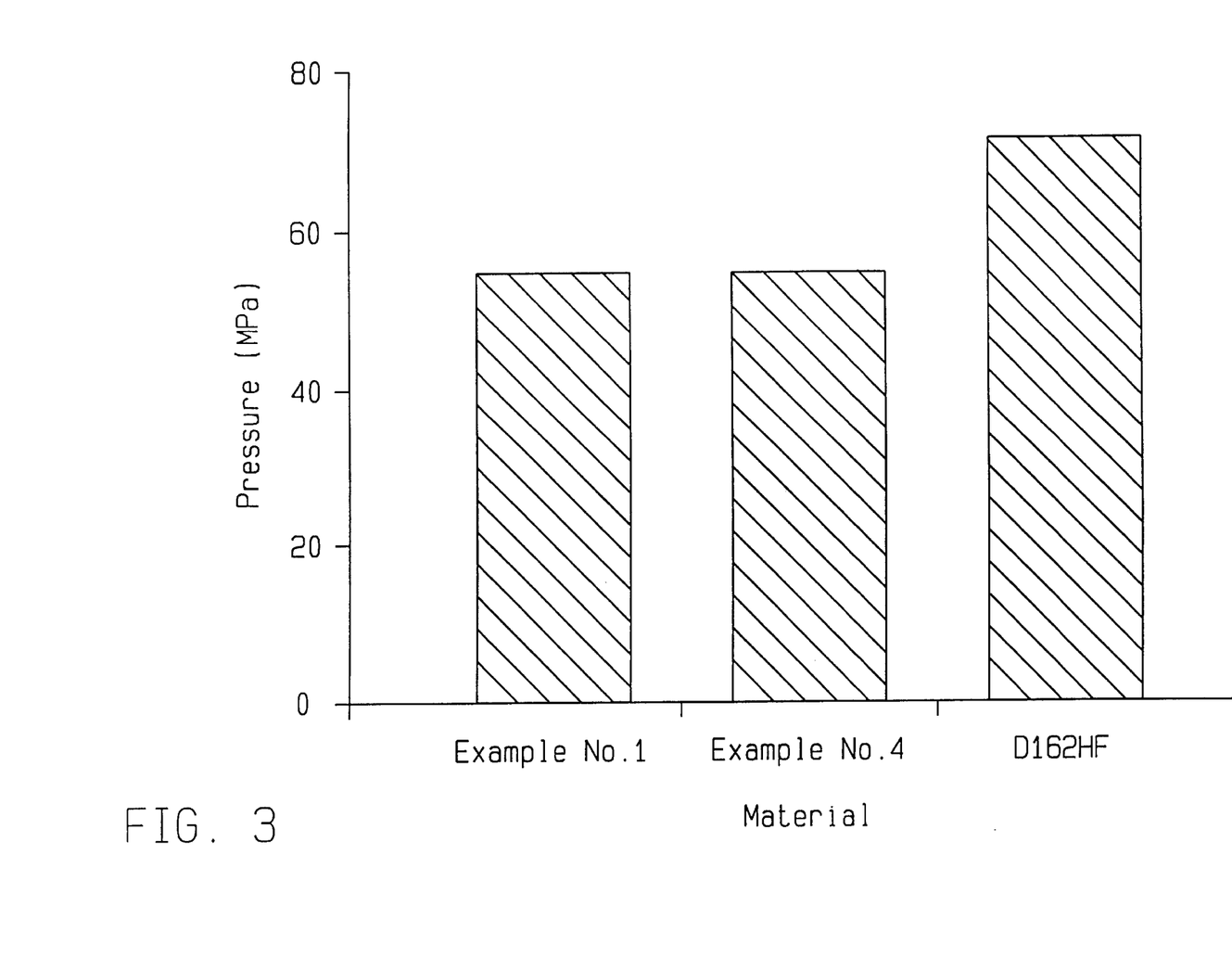
FIG. 3 compares injection molding pressures of the compositions of examples 1 and 4 of[]the invention to commercially available composition.
Figure 4:
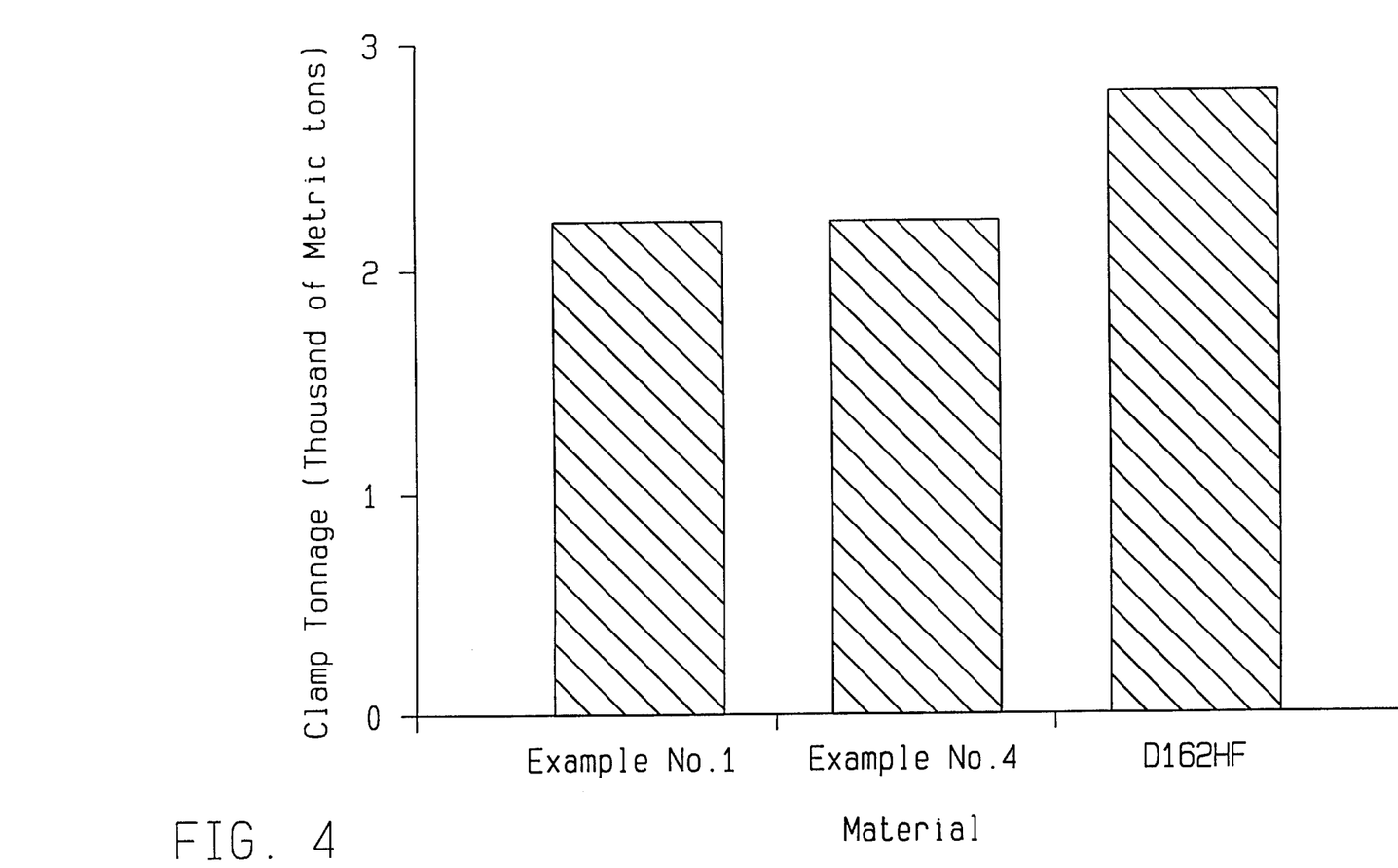
FIG. 4 compares clamp tonnage to fill a mold with the compositions of examples 1 and 4 of the invention to commercially available composition D162HF.

Morphology of blends of Groups (I)–(III) shows excellent dispersion of components with the biggest domains being the filler particles. Apart from the filler, the average domain size is less than 2 $\mu$m. This indicates excellent compatibility of components as shown in FIGS. 1 and 2. This compatibility, combined with the high melt flow rate of the blend, leads to a characteristic thin layering typically less than about 0.5 $\mu$m, near the surface of the injection molded specimens produced from the compositions of the invention. This is illustrated in FIGS. 3 and 4 which show the morphology of the skin layer of specimens formed from the composition of example 5 of the invention.

The blends of Groups (I)–(III) can be molded or otherwise formed to produce articles which are lightweight, durable, and have surfaces which are paint receptive. The components also can be pelletized for storage and shipment prior to molding into shaped articles by known methods.

Products formed of any of the blends of Groups (I)–(III) can be coated with paints, particularly with paints such as commercially available two-component blend polyurethanes to provide products with superior fluid resistance. The blends of Groups (I)–(III) may be coated with paints which have active functional groups such as acrylics, polyesters, epoxy resins, carboimides, urea resins, melamine-formaldehyde resins, enamines, ketimines, amines, and isocyanates to provide products with improved fluid resistance. These types of paints are well known in the paint and coatings industry.

Products having superior physical properties and adherence for coating materials such as paints can be prepared by mixing any of the blends of Groups (I)–(III) with, if desired, optional-additives by using extruders, Banbury mixers, rollers, brabenders and kneaders. Molded products may be prepared from any of-blends of Groups (I)–(III) by known methods such as injection molding, extrusion molding, and blow molding. Injection molding is preferred.

Blends of Groups (I)–(III) present a significant advantage in injection molding compared to conventional thermoplastic polyolefin blends. A computer simulation of the molding conditions for the blends of Groups (I)–(III) show lower injection pressure, lower clamp tonnage and shorter cycle time than conventional thermoplastic polyolefin blends having comparable viscosities under standard conditions.

The computer simulation, performed using the commercial software package C-Mold from AC Technologies, requires input of rheological and thermodynamic properties of the material under consideration. These properties can be determined experimentally. The required properties are viscosity as a function of shear rate between 5 sec$^{-1}$ and 10,000 sec$^{-1}$ at temperatures of 200° C., 230° C. and 260° C.; specific heat as a function of temperature between room temperature and 250° C., as well as density of the material in the solid state and as melted are also required. The thermoplastic polyolefin blend which serves as a control is D162HF. D162HF, available from D&S Plastics, has the highest melt flow rate for commercially available thermoplastic olefin blends.

Figure 5:
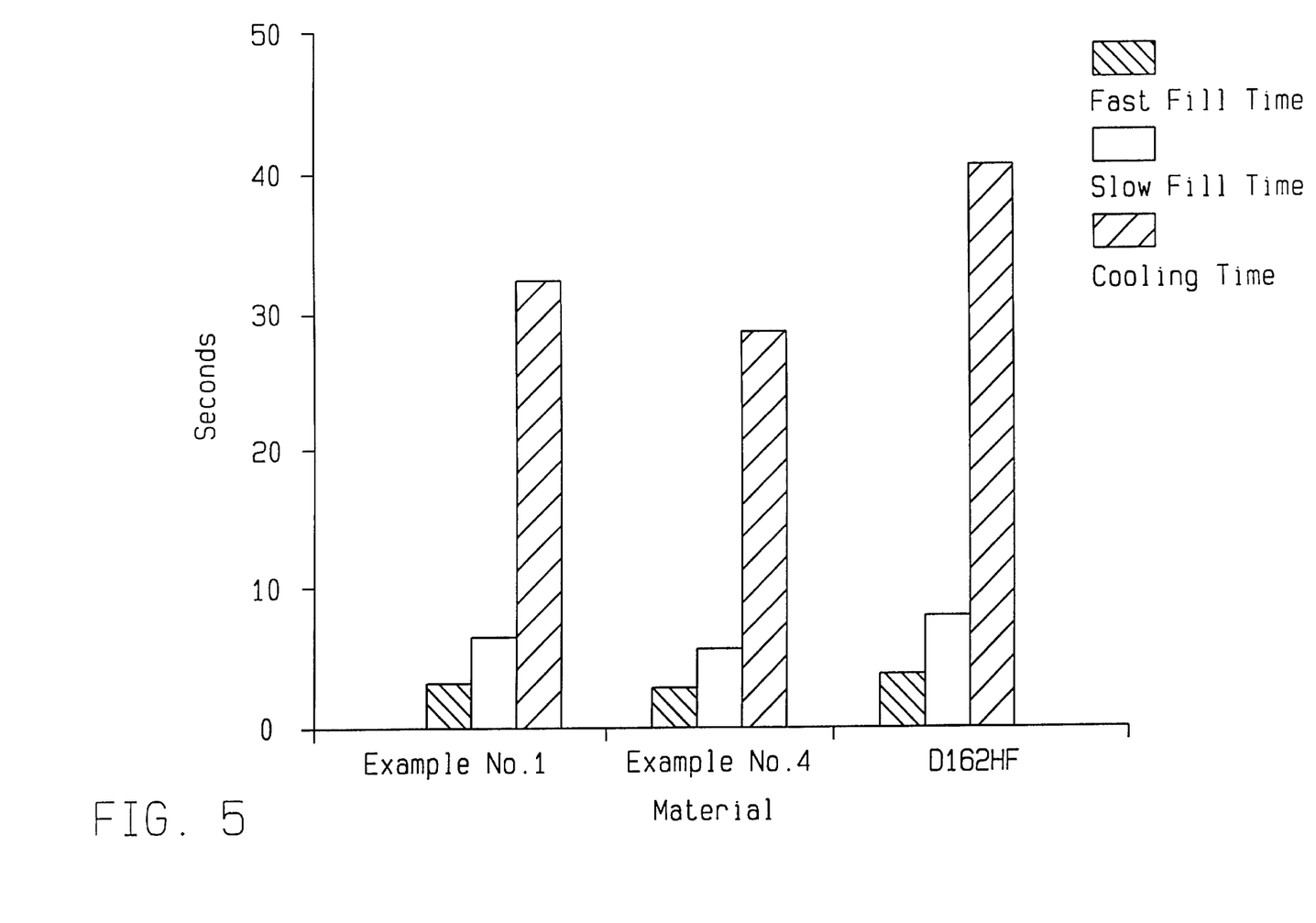
FIG. 5 compares the cool/fill times to fill a mold with the compositions of examples 1 and 4 of the invention to commercially available composition D162HF.

As shown in FIGS. 5–7, the computer simulation indicates that the maximum injection molding pressure, the clamp tonnage, as well as the fill/cool times for the compositions of Examples 1 and 4 of the invention are much less than for commercially available composition D162HF.

Generally, processing of the components of the invention can be performed using Banbury mixers or twin screw extruders. When a Banbury mixer is employed to prepare any of blends of Groups (I)–(III), a single screw extruder can be used to pelletize that component blend. The resulting pellets then are supplied to an injection molding machine for manufacture of molded articles.

During mixing of the blends of Groups (I)–(III) with a Banbury mixer, the ram pressure in the Banbury mixer is about 30–35 psi. Mixing is continued until fluxing temperature is achieved, i.e., the temperature at which the viscosity of the blend drops sharply. When fluxing temperature is achieved, mixing is terminated and the resulting batch of material is removed from the Banbury mixer. The batch then is ground into chips and/or pelletized in a single screw extruder.

Pellets of the formed component blends are supplied to an injection molding machine for injection molding into shaped products.

EXAMPLES

The invention will now be explained in more detail with reference to the following examples, which are given merely to illustrate the invention and are not intended to be limiting thereof.

Examples 1–6

The compositions of examples 1–6 are given in Table 1. Table 1 also shows the physical properties of the compositions when processed according to the conditions set forth in Table 1A. In Table 1, Ductility Index is measured by using a High Rate Impact Tester machine Model No. RIT-8000 from Rheometrics Company, Piscataway, New Jersey. The RIT-8000 is equipped with a steel probe having a size measuring 0.5" diameter by 12.25" long, and having a weight of about 0.705 lb. The probe has a spherical tip. The probe is accelerated to penetrate a specimen measuring 4"×6"×⅛" at a constant speed of 5 mph. The temperature of the specimen is −30° C.

Ductility Index is calculated from the equation $$DI = (T-U)/T$$

where

DI = Ductility Index,

T represent total energy at the point at which the probe has broken through the specimen, i.e., the point at which the force applied to the specimen by the probe drops to zero, and U represents ultimate energy, i.e., the energy at the point at which the force exerted by the probe on the specimen is at maximum as determined from the force-position curve of force applied by the probe to the specimen vs. the position of the probe. The DI values for each of 3–5 specimens are averaged and reported as DI.

Also, in Tables 1 and 2, the peel strength is the force (g/cm) required to peel the paint off substrate, is a measure of adhesive strength of the coating to the substrate.

In determining the peel strength, an injection molded plaque, formed of a composition of the invention, of size 4×6 inches and ⅛ inch thick, is partially coated with the adhesion promoter RB899 from Morton International Co., and entirely with a topcoat of R773 from Morton, International Co. to enable lifting the topcoat from that portion of the plaque which is not coated with the adhesion promoter.

Cuts through the topcoat coating are made using a sharp knife and a metal template to form two or three one cm wide strips. The one cm side strips are slowly peeled from those portions of the plaque which are free of the adhesion promoter. A piece of polyester tape is placed on the peeled off strip to form a "handle" with which the strip is peeled further.

The prepared plaque is placed into an Instron Tensile Tester (Instron Model 1130).

The force required to peel the strip from the plaque is recorded as a function of the length of peeled off strip along the plaque. The peeling speed is two inches per minute. The average force in the entire peel is reported as the measure of adhesion strength per one cm of width of peel, i.e., in units of g/cm.

TABLE 1

| Component % | 1 | 2 | 3 | 4 | 5 | 6 | Standard TPO (Control) |
|---|---|---|---|---|---|---|---|
| PP[1] | 62 | 62 | 65 | 65 | — | — | — |
| PP[2] | — | — | — | — | 62 | — | — |
| PP[3] | — | — | — | — | — | 62 | — |
| EPR[4] | — | — | — | — | — | — | — |
| EBR[5] | — | — | — | — | — | — | — |

TABLE 1-continued

| Component % | 1 | 2 | 3 | 4 | 5 | 6 | Standard TPO (Control) |
|---|---|---|---|---|---|---|---|
| Poly(ethylene-co-butene)[6] | 22 | 11 | 17.5 | 12 | 22 | 22 | — |
| Poly(ethylene-co-octene)[7] | 11 | 22 | 17.5 | 23 | 11 | 11 | — |
| FILLER[8] | 5 | 5 | 0 | 0 | 5 | 5 | — |
| HARDNESS[9] | 77 | 69 | 71 | 69 | 75 | 76 | 45 |
| FLEXURAL MODULUS[10] | 197 | 190 | 163 | 163 | 214 | 213 | 220 |
| MFR[11] | 19 | 22 | 27 | 24 | 18 | 27 | 12 |
| DENSITY[12] | .93 | .93 | .90 | .89 | .93 | .93 | 1.02 |
| IMPACT @-30C[13] | D | D | D | D | D | D | B |
| DUCTILITY INDEX | .38 | .36 | .34 | .36 | .38 | .37 | .25 |
| PEEL STRENGTH | 1050 | 1200 | 780 | 1200 | 830 | 1085 | 1000 |

[1]Polypropylene, MFR at (230 C., 2.16 kg) = 45 dg/min, ASTM D-1238
[2]Polypropylene, MFR at (230 C., 2.16 kg) = 49 dg/min, ASTM D-1238
[3]Polypropylene, MFR at (230 C., 2.16 kg) = 56 dg/min, ASTM D-1238
[4]Poly(ethylene-co-propylene); C2 = 50%, C3 = 50%, Mooney Viscosity at 100° C. = 35
[5]Poly(ethylene-co-butene); C2 = 75%, C4 = 25%; MFR at (190 C., 2.16 kg) = 0.8 dg/min
[6]EXXACT 4033 from Exxon Co., produced by Kaminsky catalyst process, having C2 = 80%; MFR at (190 C., 2.16 kg) = 0.3 dg/min, ASTM D-1238
[7]C2 = 80%; MFR at (190 C., 2.16 kg) = 5.0 dg/min, ASTM D-1238
[8]Average talc particle size = 0.9 micron
[9]Rockwell R hardness measured according to ASTM D-785
[10]Kpsi measured according to ASTM D-790
[11]dg/min at (230 C., 2.16 kg) as measured according to ASTM D-1238
[12]g/cc
[13]D = Ductile Failure; B = Brittle Failure measured according to ASTM D-3763

TABLE 1(a)

Processing Conditions

| PROCESSING CONDITION | EXAMPLE | | | | | |
|---|---|---|---|---|---|---|
| | 1 | 2 | 3 | 4 | 5 | 6 |
| BANBURY MIXING | | | | | | |
| ROTOR SPEED (RPM) | 185 | 185 | 190 | 190 | 185 | 185 |
| RAM PRESSURE (PSI) | 32 | 32 | 34 | 34 | 32 | 32 |
| TIME TO FLUX (SEC) | 95 | 95 | 90 | 90 | 95 | 95 |
| FLUX TEMP (° F.) | 360 | 360 | 355 | 355 | 360 | 360 |
| BATCH TEMP (° F.) | 410 | 410 | 410 | 410 | 410 | 410 |
| PELLETIZING SINGLE SCREW EXTRUDER | | | | | | |
| END ZONES TEMP (° F.) | 360 | 360 | 360 | 360 | 360 | 360 |
| CENTRAL ZONE TEMP (° F.) | 380 | 380 | 380 | 380 | 380 | 380 |
| SCREW SPEED (RPM) | 95 | 95 | 95 | 95 | 95 | 95 |
| MELT TEMP (° F) | 375 | 375 | 375 | 375 | 375 | 375 |
| MOLDING TEMPERATURE | | | | | | |
| END ZONE 1 | 340 | 340 | 340 | 340 | 340 | 340 |
| CENTRAL ZONE 2 | 360 | 360 | 360 | 360 | 360 | 360 |
| CENTRAL ZONE 3 | 360 | 360 | 360 | 360 | 360 | 360 |
| END ZONE 4 | 340 | 340 | 340 | 340 | 340 | 340 |
| SCREW SPEED (RPM) | 90 | 90 | 90 | 90 | 90 | 90 |
| MOLD TEMP (° F.) | 80 | 80 | 80 | 80 | 80 | 80 |
| INJECTION TIME (SEC) | 10 | 10 | 10 | 10 | 10 | 10 |
| COOLING TIME (SEC) | 25 | 25 | 25 | 25 | 25 | 25 |
| INJECTION PRESSURE (PSI) | 550 | 550 | 550 | 550 | 550 | 550 |
| FILLING TIME (PSI) | 10 | 10 | 10 | 10 | 10 | 10 |
| HOLDING PRESSURE (PSI) | 430 | 430 | 430 | 430 | 430 | 430 |

TABLE 1(a)-continued

Processing Conditions

| PROCESSING CONDITION | EXAMPLE | | | | | |
|---|---|---|---|---|---|---|
| | 1 | 2 | 3 | 4 | 5 | 6 |
| HOLDING TIME (SEC) | 15 | 15 | 15 | 15 | 15 | 15 |
| BACK PRESSURE (PSI) | 50 | 50 | 50 | 50 | 50 | 50 |

Examples 7–11

Table 2 illustrates additional compositions within the scope of the invention. Table 2 also shows the physical properties of the compositions when processed according to the conditions set forth in Table 2a. Ductility index and peel strength are measured as in Examples 1–6.

TABLE 2

| Component (%) | EXAMPLE No. | | | | |
|---|---|---|---|---|---|
| | 7 | 8 | 9 | 10 | 11 |
| HIPP[1] | 62 | 62 | 62 | 62 | 62 |
| H1PP[2] | — | — | — | — | — |
| HIPP[3] | — | — | — | — | — |
| EPR[4] | 33 | — | 16.5 | — | — |
| EBR[5] | — | 33 | 16.5 | — | — |
| Poly(ethylene-co-butene)[6] | — | — | — | 33 | — |
| Poly(ethylene-co-octene)[7] | — | — | — | — | 33 |
| FILLER[8] | 5 | 5 | 5 | 5 | 5 |
| HARDNESS[9] | 45 | 60 | 55 | 79 | 74 |
| FLEXURAL MODULUS[10] | 175 | 200 | 185 | 203 | 193 |
| MFR[11] | 14 | 14 | 14 | 16 | 19 |
| DENSITY[12] | 0.93 | 0.93 | 0.90 | 0.89 | 0.93 |
| IMPACT @-3OC[13] | D | B | B | B | B |
| DUCTILITY INDEX | 0.37 | 0.10 | 0.25 | 0.28 | 0.25 |
| PEEL STRENGTH | 1100 | 240 | 500 | 450 | 1180 |

[1]High crystallinity polypropylene, MFR at (230 C., 2.16 kg) = 45 dg/min, ASTM D-1238
[2]High crystallinity polypropylene, MFR at (23O C., 2.16 kg) = 49 dg/min, ASTM D-1238
[3]High crystallinity polypropylene, MFR at (230 C., 2.16 kg) = 56
[4]Poly(ethylene-co-propylene-); C2 = 50%, C3 = 50%, Mooney Viscosity at 100° C. = 35
[5]Poly(ethylene-co-butene); C2 = 75%, C4 = 25%; MFR at 190 C, 2.16 kg = 0.8 dg/min, prepared by conventional process, e.g., Flexomer (Union Carbide), Tafmer (Mitsui Petrochemical)
[6]EXXACT 4033 from Exxon Co., produced from Kaminsky catalyst, and having C2 = 80%; MFR at (190 C., 2.16 kg) = 0.3 dg/min, ASTM D-1238
[7]C2 = 80%; MFR at (190 C, 2.16 kg) = 5.0 dg/min, ASTM D-1238
[8]Talc, particle size = 0.9 micron
[9]Rockwell R hardness measured according to ASTM D-785
[10]Kpsi measured according to ASTM D-790
[11]dg/min at 230 C and 2.16 kg as meaeured according to ASTM D-1238
[12]g/cc
[13]D = Ductile Failure; B = Brittle Failure measured according to ASTM D-3763

TABLE 2 (a)

Processing Conditions

| EXAMPLE/PROCESSING CONDITION | 7 | 8 | 9 | 10 | 11 |
|---|---|---|---|---|---|
| BANBURY MIXING | | | | | |
| ROTOR SPEED (RPM) | 185 | 185 | 185 | 185 | 185 |
| RAM PRESSURE (PSI) | 32 | 32 | 32 | 32 | 32 |

TABLE 2 (a)-continued

Processing Conditions

| EXAMPLE/PROCESSING CONDITION | 7 | 8 | 9 | 10 | 11 |
|---|---|---|---|---|---|
| TIME TO FLUX (SEC) | 110 | 110 | 110 | 95 | 95 |
| FLUX TEMP (F. °) | 380 | 380 | 380 | 360 | 360 |
| BATCH TEMP (° F.) | 420 | 420 | 420 | 410 | 410 |
| PELLETIZING | | | | | |
| END ZONE TEMP (° F.) | 360 | 360 | 360 | 360 | 360 |
| CENTRAL ZONE TEMP (° F.) | 380 | 380 | 380 | 380 | 380 |
| SCREW SPEED (RPM) | 90 | 90 | 90 | 95 | 95 |
| MELT TEMP (° F.) | 380 | 380 | 380 | 375 | 375 |
| MOLDING TEMPERATURE | | | | | |
| END ZONE 1 | 360 | 360 | 360 | 340 | 340 |
| CENTRAL ZONE 2 | 380 | 380 | 380 | 360 | 360 |
| CENTRAL ZONE 3 | 380 | 380 | 380 | 360 | 360 |
| END ZONE 4 | 360 | 360 | 360 | 340 | 340 |
| SCREW SPEED (RPM) | 85 | 85 | 85 | 90 | 90 |
| MOLD TEMP (° F.) | 80 | 80 | 80 | 80 | 80 |
| INJECTION TIME (SEC) | 10 | 10 | 10 | 10 | 10 |
| COOLING TIME (SEC) | 25 | 25 | 25 | 25 | 25 |
| INJECTION PRESSURE (PSI) | 750 | 750 | 750 | 550 | 550 |
| FILLING TIME (SEC) | 10 | 10 | 10 | 10 | 10 |
| HOLDING PRESSURE (PSI) | 550 | 550 | 550 | 430 | 430 |
| HOLDING TIME (SEC) | 15 | 15 | 15 | 15 | 15 |
| BACK PRESSURE (PSI) | 50 | 50 | 50 | 50 | 50 |

Examples 12–15

Table 3 illustrates additional compositions within the scope of this invention. Table 3 shows the durability of these compositions, as measured by the so-called SLEdge test and high speed cohesive strength test.

The SLEdge test utilizes a 15.6 lb pendulum head with a 1" wide painted strip of reaction injection molded polyurethane bolted to it. The pendulum head drops from a 90° position to tangentially impact a 4"×6" painted plaque of the molded composition after the plaque has been preheated to 175° F. for a minimum of 40 minutes. The extent of the damage is recorded as the area of paint that has been removed from the substrate in square millimeters.

The high speed cohesive strength test includes the steps of coating a 4"×6"×⅛" injection molded plaque of the composition with 0.1–0.2 mils of a chlorinated polyolefin adhesion promoter and then baking the coated composition for 30 minutes at 80° C. After cooling, a 1.5 cm strip of a 1/16" thick polycarbonate sheet is adhered to the primed surface using a two-component epoxy adhesive. The average force required to cohesively delaminate the sheet from the coated composition is measured in Newtons/meter at 75° F. and 180° F.

As shown by the tests results, peel area values are in the range of 105–450 mm² for conventional compositions while values of 40 mm² or less are obtained with the compositions of the invention. When conventional Ziegler-Natta rubbers are omitted, no peel areas at all occur, as shown by Examples 14 and 15. The inventive compositions also exhibited a significantly greater cohesive strengths than those of conventional compositions.

TABLE 3

Engineered Thermoplastic Polyolefin Compositions

| | Comparative Materials | | | | | | | | Invention | | | |
|---|---|---|---|---|---|---|---|---|---|---|---|---|
| | A | B | C | D | E | F | G | H | 12 | 13 | 14 | 15 |
| Components | | | | | | | | | | | | |
| PP homopolymer | 49 | 49 | 49 | 49 | 49 | 8 | 37 | 14 | 49 | 49 | 49 | 49 |
| PP random copolymer, 3% C2 | 10 | 10 | 10 | 10 | 10 | 0 | 0 | 0 | 10 | 10 | 10 | 10 |
| PP "block" copolymer, 8% C2 | 0 | 0 | 0 | 0 | 0 | 53 | 25 | 46 | 0 | 0 | 0 | 0 |
| EPR1$^{ZN}$ | 30 | 0 | 0 | 0 | 0 | 28 | 25 | 31 | 20 | 0 | 20 | 0 |
| EPR2$^{ZN}$ | 0 | 30 | 0 | 0 | 0 | 0 | 0 | 0 | | 0 | 0 | 0 |
| EPR3$^{ZN}$ | 0 | 0 | 30 | 0 | 0 | 0 | 0 | 0 | 0 | 0 | 0 | 0 |
| EPR4$^{ZN}$ | 0 | 0 | 0 | 30 | 0 | 0 | 0 | 0 | 0 | 0 | 0 | 0 |
| poly(ethylene-co-butene)$^{ZN}$ | 0 | 0 | 0 | 0 | 30 | 0 | 0 | 0 | 0 | 0 | 0 | 0 |
| poly(ethylene-co-butene)$^{met}$ | 0 | 0 | 0 | 0 | 0 | 0 | 0 | 0 | 10 | 30 | 0 | 0 |
| poly(ethylene-co-octene)$^{met}$ | 0 | 0 | 0 | 0 | 0 | 0 | 0 | 0 | 0 | 0 | 10 | 30 |
| Polyethylene | 8 | 8 | 8 | 8 | 8 | 8 | 8 | 8 | 8 | 8 | 8 | 8 |
| Talc | 3 | 3 | 3 | 3 | 3 | 3 | 3 | 3 | 3 | 3 | 3 | 3 |
| Durability | | | | | | | | | | | | |
| SLEdge Test, Peeled area mm$^2$ | 460 | 425 | 321 | 305 | 105 | 200 | 150 | 400 | 40 | 0 | 20 | 0 |
| High Speed Cohesive Strength | | | | | | | | | | | | |
| at 75° F., N/m | 4000 | 4100 | 4100 | 4600 | 5200 | 5000 | 5500 | 3800 | 6200 | 8000 | 8200 | 9000 |
| at 180° F., N/m | 1600 | 1600 | 1750 | 1800 | 1950 | 1800 | 2000 | 1600 | 2700 | 3800 | 3700 | 4000 |

Notes
$^{ZN}$ = Ziegler-Natta catalyzed
$^{met}$ = metallocene catalyzed
SLEdge data on all compositions coated with Red-Spot 2k urethane coating Cohesive Strength data obtained at a test speed of 200 inches/min

What is claimed is:

1. A thermoplastic material consisting essentially of: a thermoplastic component of component (1A) which is a crystalline isotactic propylene polymer; component (1B), which is a sequentially polymerized semi-crystalline blend of polypropylene and an ethylene-propylene copolymer; or component (1C), which is a mixture of component (1A) and (1B); an elastomeric component mixture of (a) a copolymer of ethylene and butene, and (b) a copolymer of ethylene and octene wherein the copolymer of ethylene and octene is produced with a metallocene or Kaminsky catalyst and has a molecular weight distribution (Mw/Mn) of less than or equal to 3; and a filler; wherein the thermoplastic component is present in the thermoplastic material in an amount of about 50 to 80% by weight, the elastomeric component mixture is present in the thermoplastic material in an amount of about 20 to 50% by weight, the ethylene-butene copolymer is present in the thermoplastic material in an amount of about 10 to 35% by weight and the ethylene-octene copolymer is present in the thermoplastic material in an amount of about 10 to 25% by weight.

2. The thermoplastic material of claim 1 wherein the thermoplastic material has a melt flow rate of at least about 10 dg/min at 230° C. and 2.16 kg as measured according to ASTM D-1238.

3. The thermoplastic material of claim 1 wherein the propylene polymer in component (1A) or (1C), or the polypropylene of component (1B) or (1C) is a polypropylene homopolymer that has a melt flow rate of about 10 to 80 dg/min at 230° C. and 2.16 kg as measured according to ASTM D-1238.

4. The thermoplastic material of claim 1 wherein the ethylene content of component (1B) or (1C) is less than 30% based on the total weight of the component.

5. The thermoplastic material of claim 1 wherein the ethylene-butene and ethylene-octene copolymers are amorphous.

6. The thermoplastic material of claim 1 wherein the filler is talc, calcium carbonate, glass fibers, mica or glass microspheres and is present in an amount of about 1–10% by weight.

7. The thermoplastic material of claim 1 which includes at least one of stabilizers, antioxidants, ultraviolet absorbers, metal soaps, anti-static agents, lubricants, nucleators, pigments, fibrous potassium titanate, fibrous magnesium oxalate, fibrous aluminum borate, carbon fibers or mixtures thereof.

8. The thermoplastic material of claim 1 having
   a Rockwell R hardness of at least about 60 as measured according to ASTM D-785,
   a flexural modulus of at least about 80 kpsi as measured according to ASTM D-790,
   a melt flow rate of at least about 10 dg/min at 230° C. and 2.16 kg as measured according to ASTM D-1238, and
   a density of about 0.95 g/cc, and wherein the article is ductile at about −30° C. when measured according to ASTM D-3763.

9. A thermoplastic material made of a blend of a base component of a homopolymer of crystalline isotactic propylene with a mixture of (a) a copolymer of ethylene and butene and (b) a copolymer of ethylene and octene produced with a metallocene or Kaminsky catalyst and having a molecular weight distribution (Mw/Mn) which is less than or equal to 3, wherein the ethylene-butene copolymer is present in the blend in an amount of about 10 to 35% by weight and the ethylene-octene copolymer is present in the blend in an amount of about 10 to 25% by weight.

10. The thermoplastic material of claim 9 wherein the propylene homopolymer has a melt flow rate of about 10 to 80 dg/min at 230° C. and 2.16 kg as measured according to ASTM D-1238.

11. The thermoplastic material of claim 9 wherein the blend includes at least one of a stabilizer, an antioxidant, an ultraviolet absorber, a metal soap, an anti-static agent, a lubricant, a nucleator, a pigment, a fibrous material, or a mixture thereof.

12. A thermoplastic material consisting essentially of a blend of about 50–80% by weight of a crystalline isotactic homopolymer of propylene; about 12–22% by weight of a copolymer of ethylene and butene; about 11–23% by weight of a copolymer of ethylene and octene produced with a metallocene or Kaminsky catalyst and having a molecular weight distribution (Mw/Mn) which is less than or equal to 3; and about 0.1 to 10% by weight of filler.

13. The thermoplastic material of claim 12 wherein the copolymer of ethylene and butene is substantially amorphous, the copolymer of ethylene and octene is substantially amorphous and produced with a metallocene catalyst, and the filler is talc and is present in an amount of about 0.1 and 5%.

14. The thermoplastic material of claim 12 wherein the material has a ductility index of at least about 0.34 and a ductile impact resistance to as low as about −30° C.

15. The thermoplastic material of claim 12 wherein the ethylene octene copolymer is present in a greater amount than that of the ethylene butene copolymer so that the material has a ductility index of at least about 0.36.

* * * * *